United States Patent Office 3,681,170
Patented Aug. 1, 1972

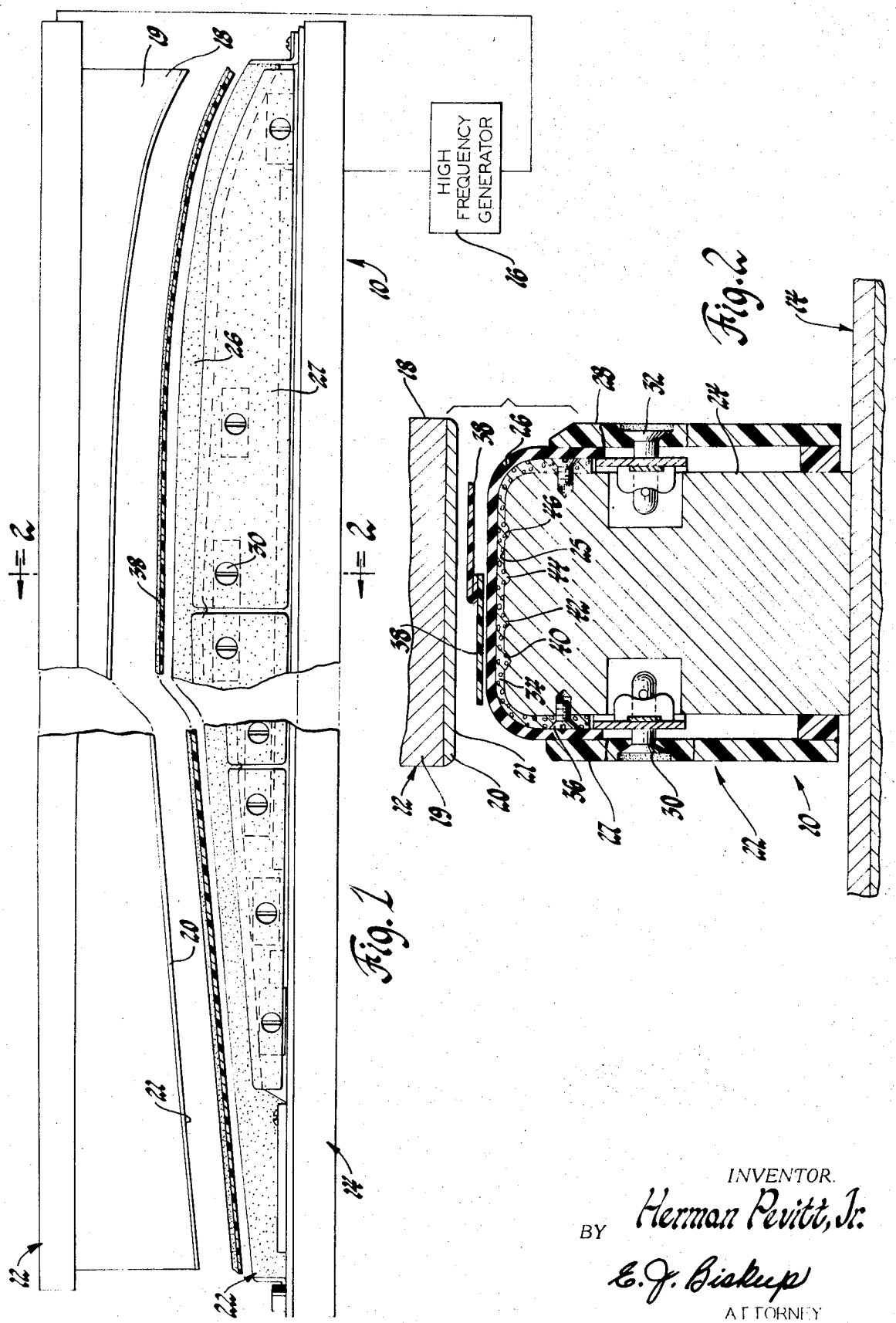

3,681,170
DIE BLADE FOR DIELECTRIC EMBOSSING PRESS
Herman Pevitt, Jr., Mount Clemens, Mich., assignor to General Motors Corporation, Detroit, Mich.
Filed May 26, 1970, Ser. No. 40,534
Int. Cl. B29c 27/04; B32b 31/20
U.S. Cl. 156—360                                        4 Claims

ABSTRACT OF THE DISCLOSURE

A die blade construction for use in a dielectric embossing press that includes a sheet of resilient insulating material secured to the pressure surface and covering the entire area thereof for minimizing arcing. In addition, a layer of foam metal is interposed between the insulating material and the pressure surface for filling any irregularities in the latter and providing an embossing surface in exact conformity with the embossing surface of the mating die blade.

In the manufacture of the soft convertible top of a motor vehicle, it is common practice to use a dielectric embossing process for joining the separate trim sheets of the vinyl material that constitutes the cover for the folding mechanism used with the convertible vehicle. The trim sheets of vinyl material are longitudinally folded so as to form a seam and are placed between a pair of matching embossing blades which are of a length approximating that of the roof panel. The embossing blades are curved in longitudinal cross section and because of their size it has been found difficult to provide an even pressure distribution even though a sheet of material, such as silicone rubber, covers the surface of one of the blades. As a result, the opposed embossing surfaces of both blades must be precisely formed to assure that the vinyl trim sheets are bonded at all points along the seam.

This invention contemplates a die blade construction which will alleviate the high cost and other problems associated with obtaining a pair of exact mating blades heretofore required for the bonding operation described above. Rather than utilizing a pair of precisely formed die blades, this invention permits one of the die blades to be made with a slightly irregular top surface which is covered with a foam metal sheet. This die blade is then mated with the other die blade which is precisely formed and a pressure of about 1000 p.s.i. is applied causing the inner portion of the foam metal sheet to fill in any voids and surface irregularities that may be part of the associated die blade. The top surface of the foam metal sheet will then correspond exactly with the precisely formed embossing surface of the other die blade. The foam metal sheet, in turn, is covered with a resilient insulating material, such as silicone rubber, and the two are securely fastened to the base of the die blade.

The objects of the present invention are to provide a die blade construction for a dielectric embossing press in which a foam metal sheet is utilized as a pressure surface; to provide a die blade which has a curved configuration and utilizes a soft compressible metal as a cover sheet which conforms in shape with the configuration of a mating die blade upon the application of pressure between the two; and to provide a dielectric embossing die blade construction utilizing a sheet of porous metal which is compressible and fills in any voids and irregularities in the surface of the die blade when subjected to pressure by the embossing surface of a mating die blade.

These and other objects of this invention will become more apparent from the following detailed description when taken with the drawing in which:

FIG. 1 is a side elevational view showing a dielectric embossing press incorporating a die blade construction made in accordance with the invention, and FIG. 2 is an enlarged sectional view showing the details of construction of the die blade referred to in connection with FIG. 1.

Referring now to FIG. 1 of the drawings, a dielectric embossing press 10 is shown comprising an upper electrode 12 and a lower electrode 14, both of which are connected in series with a high frequency alternating current generator 16. The upper electrode 12 is movable through operating means (not shown) toward and away from the lower electrode 14, while the generator 16 is capable of impressing an alternating current at a frequency between 1 and 100 megacycles between the electrodes. This type of press is well known in the art and, therefore, a detailed description thereof is not deemed necessary; however, for further information regarding its operation, reference is made to U.S. patent Dusina et al. 2,946,713 which is assigned to the assignee of this invention and issued on July 26, 1960.

The upper electrode 12 rigidly supports an upper die blade member 18 having a base portion 19 which as seen in FIG. 2, is generally rectangular in cross section and is made of aluminum. A sheet of stainless steel 20 is rigidly secured to the lower surface of the base portion which is precisely machined to a desired curvature extending along the longitudinal axis of the die blade member 18. The sheet of stainless steel is fastened to the base portion 19 by a plurality of screws and has a lower embossing surface 21 which has the exact form and shape of the lower surface of the base portion.

The lower die blade member 22 is rigidly attached to the lower electrode 14 and also includes a base portion 24 which is generally rectangular in cross section and preferably made from a metal such as aluminum. The top surface 25 of the base portion 24 serves as a pressure surface and is flat in a transverse direction but assumes an arcuate form in the longitudinal direction which corresponds to the curved configuration of the lower embossing surface 21 formed with the upper die blade member 18. A sheet 26 of insulating material such as silicon rubber covers the entire top surface 25 of the base portion 24 and is rigidly held in position by a pair of laterally spaced clamping members 27 and 28 which can be made from melamine plastic and secured to the base portion 24 through fasteners 30 and 32. Interposed between the sheet 26 of insulating material and the top surface 25 is a sheet 34 of foam metal which also covers the entire top surface of the base portion 24 and is rigidly fastened to the sides thereof by a plurality of threaded fastener members 36 spaced along the length of the lower die blade member 22. The sheet 34 of foam metal is preferably made from a metal such as nickel and has a thickness of approximately 0.135 inch. In the preferred form, the density of the metal is approximately 5% by volume so that approximately 95% of the sheet is air.

Although the process of manufacturing foam metal of the type incorporated with the die construction described above does not form any part of this invention, one method employed requires the use of an appropriate, destructible, reticulated, open-cell form of polyurethane as a substrate. One material which falls into this category is known as etched premium grade Scott Industrial Foam which is a flexible ester-type polyurethane produced by the Scott Paper Company. While sheets of this polyurethane material range in thickness from 1/32 inch to 1/2 inch, the thickness selected for duplicating the sheet of foam metal used with this invention would be 1/8 inch. Material of this type has cell sizes of approximately 100 cells per lineal inch and the sheet is first washed for about 1 minute in an organic solvent to remove any undesirable organic contaminants. Following the solvent treatment, the sheet is washed and sensitized by alternately squeezing for three minutes in a solution containing 2.5 g./l. SnCl$_2$, 100 ml./l. conc. HCl, and H$_2$O. After the preparatory steps are completed, the sheet is cut into a rectangular panel and mounted in a conductive frame which is placed in a plating cell having provisions for concurrently depositing metal from both sides of the panel. The plating cell contains a nickel plating bath. Once the panel is coated with the desired metal content, it is then subsequently removed, rinsed and dried. It is then heated in an oxidizing environment so as to decompose the plastic substrate and oxidize the carbon. For a more complete understanding of the manufacture of foam metal material of a type that can be used with this invention, reference is made to copending U.S. patent application Ser. No. 724,544, filed Apr. 26, 1968, entitled "Three-Dimensional Electroformed Reticulated Latticework," in the names of Seymour Katz and Joseph L. Greene, and assigned to the assignee of this invention.

As mentioned hereinbefore, the upper die blade member 18 includes the embossing surface 21 which conforms in shape with the precisely machined lower surface of the base portion 19 as required for embossing trim sheets 38 of vinyl such as seen in FIG. 2. Moreover, the lower die blade member 22 has a base portion 24, the top surface 25 of which generally conforms to the shape of the embossing surface 21 of the upper die blade member 18. However, precise mating of the die blade members is not required in this case because of the use of the sheet 34 of foam metal material which is placed on the top surface 25 of the base portion 24. In this regard and as best seen in FIG. 2, certain voids and irregularities such as identified by the reference numerals 40, 42, 44 and 46 can appear in the top surface 25 of the base portion 24 as might be caused during a preliminary machining operation. In order, however, to obtain an upper surface exactly conforming with the lower embossing surface 21 so as to permit equal pressure distribution between the die blade members and bonding of the thermoplastic sheets along the entire length of the seam without any interruptions, the foam metal sheet 34 is first positioned onto the top surface 25 of the base portion 24 and fastened thereto by the threaded fasteners 36. Thereafter, a sheet of soft aluminum having a thickness of 0.218±.005 inch is placed on the foam metal sheet 34 and the dielectric embossing press 10 is closed causing the embossing surface 21 of the upper die blade member 18 to contact the sheet of soft aluminum and compress the foam metal preferably at a pressure of 1000 p.s.i. This results in the sheet 34 of foam metal being compressed and causes portions of it to fill the aforementioned voids and irregularities which may exist in the top surface 25 of the base portion 24. The upper surface of the sheet 34 of foam metal will take the form of the precisely formed embossing surface of the upper die blade member. Subsequently, the sheet of soft aluminum is removed and replaced by a sheet 26 of silicon rubber having substantially the same thickness and is positioned on the sheet 34 to prevent arcing and unnecessary wear between the die blade members.

Although only one specific type of foam metal is described in connection with this invention, it will be understood that foam metals made from nickel and other forms of metals having varying densities and thicknesses can be utilized in practicing the invention. One important consideration is that the foam metal used be made from a metal compatible for dielectric embossing. Metals which may fall into this category are copper, iron, silver, cadmium, and alloys such as bronze, iron-nickel, and iron-chrome. Another important consideration is that the thickness and density of the foam metal used be such that the press is capable of providing the compression of the foam metal into exact conformity with the embossing surface of the other die, while at the same time the foam metal should be able to resist any further compression or deformation during normal dielectric embossing pressures. Therefore, the area of the die blade, the pressure capacity, and the normal bonding pressure of a particular dielectric embossing press will determine the density and, in some cases, the thickness of the foam metal to be used. For example, if the dielectric embossing press used has sufficient capacity to provide a pressure on the embossing surface of the die blade of 1000 p.s.i. and normal bonding pressure is approximately 100 p.s.i., a foam metal which would be compressible into the desired form in the pressure range between approximately 100 p.s.i. and 1000 p.s.i. should be used with the die blade construction according to this invention.

The charts below indicate the compression characteristics of nickel foam metal which has been tested with die blade construction made according to the invention and could give acceptable results in a dielectric embossing operation.

| Density of foamed metal (percent) | Foamed metal thickness before compression (inches) | Compression pressure in p.s.i. | Foamed metal thickness after compression (inches) | Percent compression of original thickness |
| --- | --- | --- | --- | --- |
| 3 | .130 | 3,000 | .017-.025 | 81-87 |
| 5 | .130-.135 | 3,000 | .025-.030 | 79 |
| 8 | .135 | 1,000 | .040 | 70 |
| 12 | .075 | 3,000 | .036 | 54 |
| 20 | .140-.145 | 3,000 | .108 | 24 |

| Density of foamed metal (percent) | Foamed metal thickness before compression (inches) | Compression pressure in p.s.i. | Foamed metal thickness after compression (inches) | Percent compression of original thickness |
| --- | --- | --- | --- | --- |
| 5 | .120-.125 | 500 | .060 | 55 |
| 5 | .125 | 500 | .060 | 52 |
| 5 | .140 | 800 | .049 | 65 |
| 5 | .125 | 1,000 | .040 | 68 |
| 5 | .135 | 1,000 | .055 | 67 |
| 5 | .130 | 3,000 | .028 | 78 |

Various changes and modifications can be made in this construction without departing from the spirit of the invention. Such changes and modifications are contemplated by the inventor and he does not wish to be limited except by the scope of the appended claims.

I claim:

1. A die blade construction for use in a dielectric embossing press having relatively movable upper and lower electrodes which are electrically connected in series with a high frequency generator, said die blade construction including an upper die blade member rigidly attached to said upper electrode, a lower die blade member rigidly attached to said lower electrode, one of said die blade members comprising a metallic base portion having a precisely formed embossing surface and adapted to engage a thermoplastic material positioned between said die blade members during a dielectric embossing operation, the other of said die blade members comprising a metallic base portion having a pressure surface generally conforming to said embossing surface, a sheet of resilient insulating material secured to the base portion and covering the entire area of the pressure surface for minimizing arcing between said electrodes, and a sheet of foam metal interposed between said sheet of insulating material and compressed by the precisely formed embossing surface of said one of said blades against said pressure surface for filling any irregularities in the latter and providing an embossing surface in exact conformity with said precisely formed embossing surface.

2. A die blade construction for use in a dielectric embossing press for bonding sheets of thermoplastic material together, said press having relatively movable upper and lower electrodes which are electrically connected in series with a high frequency generator, said die blade construction comprising an elongated upper die blade member rigidly attached to said upper electrode, an elongated lower die blade member rigidly attached to said lower electrode, one of said die blade members comprising a metallic base portion having a precisely formed embossing surface which is curved in a longitudinal direction and made of steel and adapted to engage said sheets of thermoplastic material positioned between said die blade members during a dielectric embossing operation, the other of said die blade members comprising a metallic base portion having a pressure surface generally conforming to said embossing surface, a sheet of insulating material secured to the base portion and covering the entire area of the pressure surface for minimizing arcing between said electrodes, and a sheet of nickel foam metal having a 3% to 20% by volume metal content interposed between said sheet of insulating material and compressed against said pressure surface for filling any irregularities in the latter and providing an embossing surface in exact conformity with said precisely formed embossing surface.

3. A die blade construction for use in a dielectric embossing press having relatively movable upper and lower electrodes which are electrically connected in series with a high frequency generator, said die blade construction including an upper die blade member rigidly attached to said upper electrode, a lower die blade member rigidly attached to said lower electrode, one of said die blade members comprising a metallic base portion having a precisely formed embossing surface and adapted to engage a thermoplastic material positioned between said die blade members during a dielectric embossing operation, the other of said die blade members comprising a metallic base portion having a pressure surface generally conforming to said embossing surface, a sheet of resilient insulating material secured to the base portion and covering the entire area of the pressure surface for minimizing arcing between said electrodes, and a sheet of foam metal made from the group consisting of nickel, copper, iron, silver and cadmium interposed between said sheet of insulating material and compressed against said pressure surface for filling any irregularities in the latter and providing an embossing surface in exact conformity with said precisely formed embossing surface.

4. A die blade construction for use in a dielectric embossing press having relatively movable upper and lower electrodes which are electrically connected in series with a high frequency generator, said die blade construction including an upper die blade member rigidly attached to said upper electrode, a lower die blade member rigidly attached to said lower electrode, one of said die blade members comprising a metallic base portion having a precisely formed embossing surface and adapted to engage a thermoplastic material positioned between said die blade members during a dielectric embossing operation, the other of said die blade members comprising a metallic base portion having a pressure surface generally conforming to said embossing surface, a sheet of resilient insulating material secured to the base portion and covering the entire area of the pressure surface for minimizing arcing between said electrodes, and a sheet of foam metal made from nickel having a metal content of approximately 5% by volume and a cell content of approximately 100 cells per lineal inch interposed between said sheet of insulating material and compressed against said pressure surface for filling any irregularities in the latter and providing an embossing surface in exact conformity with said precisely formed embossing surface.

References Cited
UNITED STATES PATENTS

| | | | |
|---|---|---|---|
| 3,360,417 | 12/1967 | Peterson et al. | 156—380 |
| 3,126,307 | 3/1964 | Drittenbass | 156—380 X |
| 3,052,590 | 9/1962 | Maros et al. | 156—380 UX |

BENJAMIN A. BORCHELT, Primary Examiner

J. J. DEVITT, Assistant Examiner

U.S. Cl. X.R.

156—219, 583